United States Patent [19]
Dabbish

[11] Patent Number: 4,972,478
[45] Date of Patent: Nov. 20, 1990

[54] SOFT LOGIC CRYPTOGRAPHIC CIRCUIT

[75] Inventor: Ezzat A. Dabbish, Buffalo Grove, Ill.

[73] Assignee: Motorola, Inc., Schaumburg, Ill.

[21] Appl. No.: 375,175

[22] Filed: Jul. 3, 1989

[51] Int. Cl.⁵ .............................................. H04L 9/28
[52] U.S. Cl. ........................................ 380/28; 380/2; 380/9; 380/50
[58] Field of Search ...................... 380/4, 9, 21, 28, 29, 380/49, 50, 2; 364/200, 900, 222.5, 224.21, 260.81, 260.9, 286.4, 286.5, 918.7, 943.7, 944.5

[56] References Cited
U.S. PATENT DOCUMENTS

| | | | |
|---|---|---|---|
| 4,484,025 | 11/1984 | Ostermann et al. | 380/21 |
| 4,797,928 | 1/1989 | Dykes | 380/49 |
| 4,807,288 | 2/1989 | Ugon et al. | 380/4 X |

Primary Examiner—Stephen C. Buczinski
Assistant Examiner—Bernarr Earl Gregory
Attorney, Agent, or Firm—Timothy W. Markison; Steven G. Parmelee; Joseph P. Krause

[57] ABSTRACT

A soft logic cryptographic circuit that can be reprogrammed with various cipher algorithms. The cryptographic circuit can be manufactured in a non-secure environment because a security sensitive cipher algorithm can be programmed after the manufacturing process.

14 Claims, 1 Drawing Sheet

SOFT LOGIC CRYPTOGRAPHIC CIRCUIT

TECHNICAL FIELD

This invention relates generally to encryption of security sensitive digital information and in particular to cryptographic circuitry that implements a cipher algorithm.

BACKGROUND OF THE ART

It is well known in the art to use cipher algorithms to encrypt digital information. A cryptographic circuit which implements a cipher algorithm is generally constructed of hardware and is not changeable. By having the cipher algorithm fixed in hardware, the encryption process can readily be deciphered, thus to enhance the security of the encryption process, a changeable encryption key is used. The prior art discloses several ways of changing the encryption key.

It is also well known in the art that manufacturing of security sensitive cryptographic circuits must be done in a secure environment. This requirement substantially adds to the manufacturing costs. In addition to the increased costs, a cryptographic circuit cannot readily be modified to perform a different cipher algorithm. Thus, if the cipher algorithm has to be changed, a substantial redesign must be done.

A need exists for a cryptographic circuit that can be manufactured in a non-secure environment, that can be readily reprogrammed with a different cipher algorithm, and that enhances the security of the encryption process.

SUMMARY OF THE INVENTION

These needs and others are substantially met by the soft logic cryptographic circuit disclosed herein. The soft logic cryptographic circuit can be programmed or reprogrammed with a cipher algorithm by: (a) programming a reprogrammable supervisory circuit with cipher algorithm storage instructions per initial instructions stored within the reprogrammable supervisory circuit; (b) programming a reprogrammable cryptographic core with the cipher algorithm per the cipher algorithm storage instructions; (c) performing a cipher algorithm storage integrity test on the cryptographic core; (d) reprogramming the reprogrammable supervisory circuit with cipher algorithm execution instructions per the initial instructions; and (e) performing a cipher algorithm execution test on the cryptographic circuit to verify proper operation.

In an embodiment, the reprogrammable supervisory circuit comprises a reprogrammable storage device, a random access memory device (RAM) and a read only memory device (ROM). The RAM receives preliminary storage instructions from external programming equipment and stores them per the initial instructions stored in the ROM. Next, the reprogrammable storage device receives cipher algorithm storage instructions from the external programming equipment and stores them per the preliminary storage instructions. The cryptographic core device receives the cipher algorithm from the external programming equipment and stores it per the cipher algorithm storage instructions.

After the storage integrity of the cipher algorithm is verified, the RAM receives preliminary execution instructions from the external programming equipment and stores them per the initial storage instructions. Next, the reprogrammable storage device receives cipher algorithm execution instructions from the external programming equipment and stores them per the preliminary execution instructions. Finally, the external programming equipment performs a cipher algorithm execution test on the cryptographic circuit to verify that it properly encrypts and decrypts digital information.

BEST MODE FOR CARRYING OUT THE INVENTION

Figure 1:
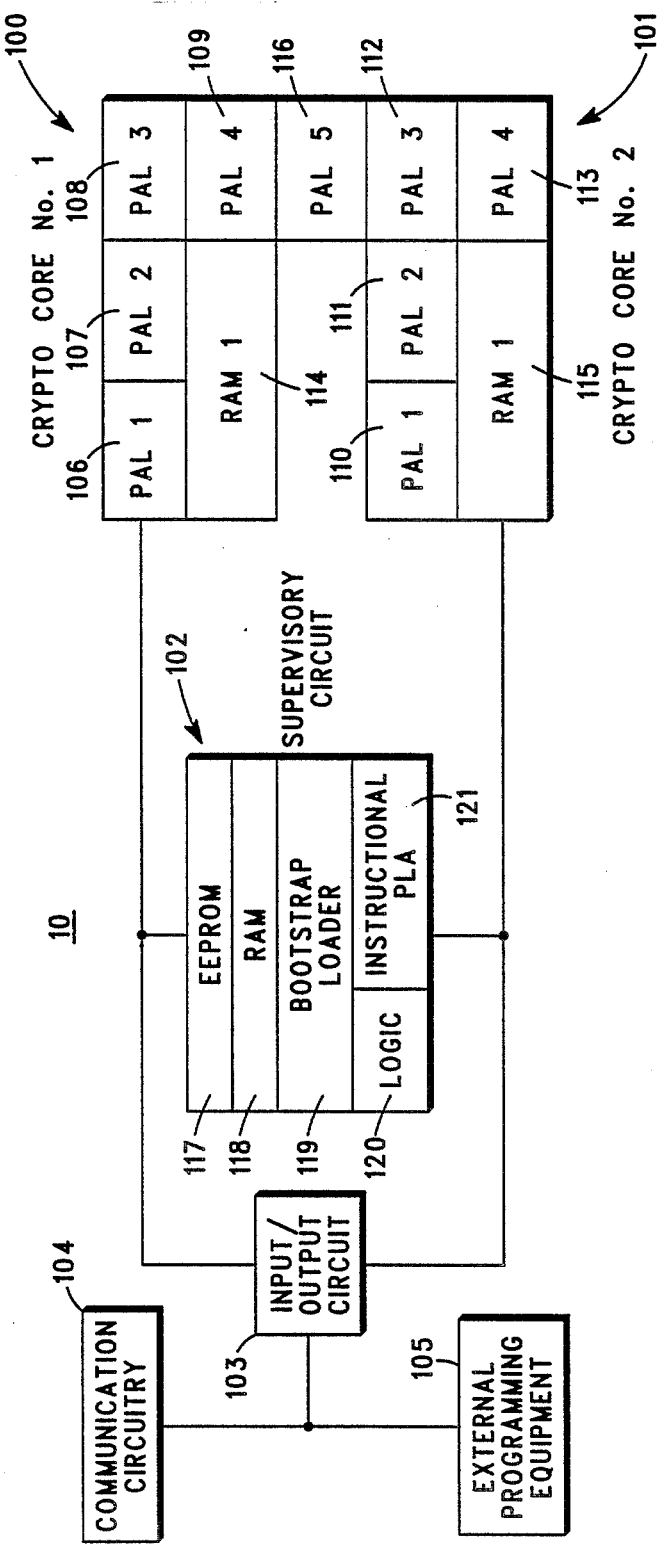
FIG. 1 illustrates a block diagram of the cryptographic circuit.

FIG. 1 illustrates a block diagram of the cryptographic circuit (10) comprising two cryptographic cores (100 & 101), a supervisory circuit (102), an input/output circuit (103), communication circuitry (104), a programmable array logic device (PAL) (116), and external programming equipment (EPE) (105). Each cryptographic core (100 & 101) is comprised of four PALs (106–109 and 110–113) and a RAM (114 & 115). The cryptographic cores (100 & 101) are fully discussed in patent application Ser. No. 07/150,876 filed on Jan. 28, 1988, now U.S. Pat. No. 4,914,697, and will only be discussed herein as needed.

The supervisory circuit (102) comprises a reprogrammable storage device, in this illustration an electronically erasable programmable read only memory device (EEPROM) (117), a RAM (118), a bootstrap loader (119), logic (120), and an instructional programmable logic array (PLA) (121). The bootstrap loader (119) can be a read only memory device (ROM).

One of the primary features of the present invention is that it can be programmed with a cipher algorithm at any time. Generally, the EPE (105) programs, via the input/output circuit (103), the supervisory circuit (102) with cipher algorithm storage and execution instructions and the cryptographic cores (100 & 101) with at least one cipher algorithm. An initial instruction set, or initial instructions, stored in the supervisory circuit (102) prepares the cryptographic circuit (10) to receive the programming information from the EPE (105) and, initially, how to store it. The following steps set forth one way to program the cryptographic circuit (10) with a cipher algorithm.

Step 1. The RAM (118) receives preliminary storage instructions from the external programming equipment (EPE) (105) and stores them per the initial instructions. The initial instructions are stored in the bootstrap loader (119) and, as mentioned above, prepare the cryptographic circuit (10) to receive programming information from the EPE (105) by performing typical boot up functions.

Step 2. The EEPROM (117) receives cipher algorithm storage instructions from the EPE (105) and stores them per the preliminary storage instructions.

Step 3. The cryptographic cores (100 & 101) receive a cipher algorithm from the EPE (105) and store it per the cipher algorithm storage instructions. The EPE (105) could, if desired to further enhance security, program each cryptographic core (100 & 101) with a different cipher algorithm.

Step 4. The EPE (105) performs a cipher algorithm storage test to verify the storage integrity of the cipher algorithm. The EPE (105) could also disable, through a variety of conventional methods, the cryptographic cores (100 & 101) from being reprogrammed with a new cipher algorithm.

Step 5. The RAM (118) receives preliminary execution instructions from the EPE (105) and stores them per the initial instructions. The preliminary execution instructions can be stored in such a way as to overwrite the preliminary storage instructions. This offers an additional security mechanism of preventing later reconstruction of the preliminary cipher algorithm storage sequence.

Step 6. The EEPROM (117) receives cipher algorithm executions instructions from the EPE (105) and stores them per the preliminary execution instructions. The cipher algorithm executions instructions can be stored in such a way as to overwrite the cipher algorithm storage instructions. This further provides additional security by preventing the cipher algorithm storage sequence to be reconstructed.

Step 7. The EPE (105) performs an execution test to verify that the cryptographic circuit (10) accurately performs the cipher algorithm. The EPE (105) could also disable, through a variety of conventional methods, the EEPROM (117) from receiving any further cipher algorithm execution instructions.

Once the cipher algorithm or algorithms are accurately stored and their execution verified, the cryptographic circuit (10) can encrypt/decrypt digital information. The input/output circuit (103), which has been programmed with digital information storage instructions, receives digital information and stores it in one or both of the cryptographic cores (100 & 101) per the digital information storage instructions. The supervisory circuit (102) which, in addition to performing other possible cipher algorithm execution instructions, controls the encryption of the digital information by one or both of the cryptographic core (100 & 101). After the cryptographic cores (100 & 101) perform the cipher algorithm, the encrypted digital information is sent to the communication circuitry (104), through the input/output circuit (103), for transmission or other communication function. PAL 5 (116), which has been programmed with an output verification program, monitors the output of each cryptographic core (100 & 101) to verify the accuracy of the encryption process. The decryption of digital information works in basically the same manner.

The cryptographic circuit (10), which is to encrypt security sensitive digital information, can be manufactured in a non-secure environment because the cryptographic cores (100 & 101) and the supervisory circuit (102) are reprogrammable. By being reprogrammable, the cryptographic cores (100 & 101) and the supervisory circuit (102) can be built and fully tested in a non-secure environment using non-secure test algorithms, cipher algorithm storage instructions and cipher algorithm execution instructions. Using appropriate external programming equipment, the security sensitive cipher algorithm, cipher algorithm storage instructions and cipher algorithm execution instructions can be programmed, overwriting the test algorithms and instructions, after the manufacturing process is complete. In addition to allowing the security sensitive cipher algorithm to be stored after manufacturing, the configuration of the cryptographic circuit (10) does not reveal the type of cipher algorithm being performed. Thus, the security of the encryption process is enhanced.

The soft logic cryptographic circuit (10) is capable of storing and executing various types of cipher algorithms. This feature is very important because, as of Jan. 1988, the National Security Agency (NSA) will no longer accept new communication equipment which utilizes certain types of cipher algorithms. Because of the reprogrammability of the soft logic cryptographic circuit (10), it can be easily reprogrammed with an approved cipher algorithm, where the devices of the prior art must, in many cases, be substantially redesigned.

The soft logic cryptographic circuit (10) is readily adapted to metal oxide semiconductor (MOS) or other integrated circuit chip layouts. In chip form, the cryptographic circuit (10) can be packaged as an integrated circuit (IC) device.

What is claimed is:

1. A method for programming a cipher algorithm into a reprogrammable cryptographic circuit, the programming method comprising the steps of:
    (a) programming the reprogrammable supervisory circuit with cipher algorithm storage instructions as defined by initial instructions stored in the reprogrammable supervisory circuit;
    (b) programming at least one cryptographic core of the reprogrammable cryptographic circuit with the cipher algorithm as defined by the cipher algorithm storage instructions;
    (c) performing a cipher algorithm storage integrity test on the at least one cryptographic core device to verify that the cipher algorithm was stored accurately;
    (d) programming the reprogrammable supervisory circuit with cipher algorithm execution instructions as defined by the initial instructions; and
    (e) performing a cipher algorithm execution test on the reprogrammable cryptographic circuit to verify that the reprogrammable cryptographic circuit properly executes the cipher algorithm.

2. The programming method of claim 1 wherein, after step (c), the programming method further comprises the step of disabling the cryptographic core device from having the cipher algorithm reprogrammed.

3. The programming method of claim 1 wherein, after step (e), the programming method further comprises the step of disabling the reprogrammable supervisory circuit from having the cipher algorithm execution instructions reprogrammed.

4. The programming method of claim 1 wherein the programming of the supervisory circuit with the cipher algorithm execution instructions overwrites the cipher algorithm storage instructions.

5. The programming method of claim 1 wherein the reprogrammable supervisory circuit comprises:
    reprogrammable storage means for storing the cipher algorithm storage instructions and for storing the cipher algorithm execution instructions;
    at least one random access memory (RAM) device operably coupled to the reprogrammable storage means; and
    at least one read only memory (ROM) device operably coupled to the reprogrammable storage means and the RAM, wherein the ROM stores the initial instructions.

6. The programming method of claim 5 wherein step (a) comprises the substeps of:
    (1) programming the RAM with preliminary storage instructions as defined by the initial instruction;

(2) programming the reprogrammable storage device with the cipher algorithm storage instructions as defined by preliminary storage instructions.

7. The programming method of claim 6 wherein step (d) comprises the substeps of:
   (1) programming the RAM with preliminary execution instructions as defined by the initial instructions, where the preliminary execution instructions overwrite the preliminary storage instructions;
   (2) programming the reprogrammable storage means with the cipher algorithm execution instructions as defined by the preliminary execution instructions, where the cipher algorithm execution instructions overwrite the cipher algorithm storage instructions.

8. The programming method of claim 5 wherein the reprogrammable storage means comprises at least one electronically erasable programmable read only memory device.

9. A cryptographic circuit comprising:
   at least one reprogrammable cryptographic core device comprising means for storing and executing a cipher algorithm and for storing digital information;
   reprogrammable supervisory means, operably associated with the at least one reprogrammable cryptographic core device for utilizing cipher algorithm storage instructions to control the storing of the cipher algorithm in the at least one reprogrammable cryptographic core and for utilizing cipher algorithm execution instructions to control the execution of the cipher algorithm by the at least one reprogrammable cryptographic core device; and
   input/output means, operably coupled to the at least one reprogrammable cryptographic core device and the reprogrammable supervisory means, for utilizing digital information storage instructions to control the storing of the digital information at least one reprogrammable cryptographic core device and for providing digital communication paths from the cryptographic circuit to digital information processors.

10. The cryptographic circuit of claim 9 wherein the cryptographic circuit is comprised of a semiconductor integrated circuit.

11. The cryptographic circuit of claim 9 wherein the digital information processors comprise external programming equipment and communication circuitry for use in a communication device.

12. The cryptographic circuit of claim 11 wherein the external programming equipment programs the cipher algorithm storage instructions and the cipher algorithm execution instructions into the reprogrammable supervisory means, programs the digital information storage instructions into the input/output means, programs the cipher algorithm into the at least one reprogrammable cryptographic core device, and is capable of reprogramming the input/output means, the reprogrammable supervisory means and the at least one reprogrammable cryptographic core device with new instructions and cipher algorithms respectively.

13. The cryptographic circuit of claim 9 wherein the reprogrammable supervisory means comprises;
   at least one reprogrammable storage device having storage capabilities to store the reprogrammable storage instructions and the reprogrammable execution instructions;
   at least one random access memory (RAM) device, operably associated with the reprogrammable storage device, having storage capabilities to store preliminary storage instructions and preliminary execution instructions; and and at least one read only memory (ROM) device, operably associated with the RAM, having storage capabilities to store an initial instruction set.

14. The cryptographic circuit of claim 13 wherein the reprogrammable storage device overwrites the reprogrammable storage instructions with the reprogrammable execution instructions.

* * * * *